United States Patent [19]
Nakamura et al.

[11] 3,804,476
[45] Apr. 16, 1974

[54] BEARING DEVICES FOR ROTARY MACHINES

[75] Inventors: Toshio Nakamura; Hitoshi Egawa; Sadaharu Kawai; Koichi Takahashi, all of Hitachi, Japan

[73] Assignee: Hitachi, Ltd., Tokyo, Japan

[22] Filed: July 26, 1972

[21] Appl. No.: 275,162

[30] Foreign Application Priority Data
Aug. 27, 1971   Japan.............................. 46-65112

[52] U.S. Cl. .............................................. 308/187
[51] Int. Cl. ............................................ F16c 33/66
[58] Field of Search................ 308/187, 187.1, 36.1; 310/90

[56] References Cited
UNITED STATES PATENTS
947,529   1/1910   Meston .............................. 308/187

Primary Examiner—Charles J. Myhre
Assistant Examiner—Frank Susko
Attorney, Agent, or Firm—Craig & Antonelli

[57] ABSTRACT

A bearing device for rotary machines, for example, electric motors for driving vehicles such as electric cars, of the type comprising roller or ball bearings and using oil or liquid lubricant for lubricating said roller or ball bearings, said bearing device being so designed that the oil or liquid lubricant is automatically supplied in a minimum quantity necessary for lubricating said bearings, whereby the supply interval of lubricant is extended, a leakage of lubricant is eliminated which would otherwise occur due to supply of an excessively large quantity of lubricant, the maintenance duty of the bearing device is alleviated and the continuous use of the bearing device for a long period of time becomes possible without the necessity of disassembly.

16 Claims, 4 Drawing Figures

BEARING DEVICES FOR ROTARY MACHINES

This invention relates to bearing devices for rotary machines, for example, electric motors for driving vehicles such as electric cars.

Bearing devices used in electric motors for vehicles generally comprise roller or ball bearings, and a grease lubrication method is mainly employed in such bearing devices for lubricating the roller or ball bearing rather than a lubricating method using liquid oil, because with the former method, the construction of the bearing device can be simpler and the prevention of a lubricant leakage can be achieved easier than with the latter method. Accordingly, various studies and researches are being made on a grease lubrication type bearing device as well as on a grease to be used therein.

Incidentally, it has been believed that, in the lubrication of roller or ball bearings with grease, the grease filled in the roller or ball bearing acts directly on the rolling surfaces of rolling elements, e.g., rollers or balls, to provide a lubricating effect. However, the recent study has revealed the following fact. Namely, in the case of lubrication with grease as well as the case of lubrication with liquid lubricant, the substance actually contributing to the lubrication of the roller or ball bearing is the base oil which constitutes the grease and this base oil is separated from the grease incident to temperature rise or spontaneous disintegration of the grease during operation of the roller or ball bearing and supplied to the rolling surfaces of the rolling elements to bring about the lubricating effect. It has also been found that a very small quantity of the base oil lubricates the roller or ball bearing for a long period of time. After separation of the base oil, a soap component remains which has retained the base oil, and this soap component when deteriorated sticks and solidifies on the wall of the roller or ball bearing, causing a detrimental effect on lubrication.

In this view, it is believed that one of the important measures to achieve satisfactory lubrication is to supply oil of a suitable viscosity in a necessary minimum quantity.

By the way, the system widely employed in the oil lubrication of a roller or ball bearing is an oil bath type. In this system, the oil level must be maintained at substantially the center of the lowermost rolling element of the roller or ball bearing and to this end, the oil level must be controlled externally by means of an oil gauge.

Further, in general, a lubricating oil having a high viscosity is used for a roller or ball bearing supporting a rotary element rotating at a low speed under a large load, and a lubricating oil having a low viscosity is used for a roller or ball bearing supporting a rotary element rotating at a high speed under a low load. This is because the high viscosity oil has a good load bearing property but, when used in a roller or ball bearing supporting a rotary element rotating at a high speed, becomes extremely instable as a result of being stirred intensely by the rolling elements of the roller or ball bearing or the retainer retaining said rolling elements, frequently resulting in unsatisfactory lubrication. This phenomenon obviously occurs more apparent as the viscosity of the oil becomes higher. In order to overcome such problem, a splash lubrication method is frequently used in combination, by providing an oil ring.

In the oil lubrication, the prevention of an oil leakage is also an important problem. Especially in a rotary machine rotating at a high speed, the oil tends to leak inwardly of the machine by being sucked under the effect of a large negative pressure created within the machine during the high speed operation of said machine. To prevent such oil leakage, a method has been employed, among others, to introduce pressurized air to the portion where the oil leakage would occur.

The oil lubrication method on one hand has the advantage that the supply and discharge of oil can be effected in a simpler manner than in the grease lubrication method, but on the other hand has a number of practical disadvantages such as that the construction of the bearing device becomes highly complicated by reason of the necessity for controlling the oil level or the quantity of oil supplied, as stated above, and that it is not adapted for the lubrication of a roller or ball bearing supporting a rotary element rotating at a high speed under a large load.

A rotary machine, e.g., a main electric motor for vehicles, is subjected to a strict space limitation by the interval of rails and associated equipments provided thereabout, and therefore, a bearing device of a complicate construction or large size cannot be used therein. Furthermore, since the bearing device undergoes intense vibrations or shocks, the operations of an oil ring, etc. tend to become extremely instable.

In addition, the speed of such a main electric motor is increasing more and more in recent years to meet the demand for higher speed of vehicles and larger volume of traffic, and at the same time the elimination or saving of the maintenance work of the bearing portion, which occupies a large part of the daily maintenance of the motor, is being ardently desired.

In view of the foregoing, it can be said that a preferable bearing device is the one which is simple in construction and can be used for supporting a rotary element rotating at a high speed under a large load, and concurrently can be used for a lengthy period of time without the necessity of disassembly and with the simple supply and discharge of lubricating oil, by taking advantages of the lubricating oil.

An object of the present invention is to provide a bearing device for rotary machines, in which a necessary minimum quantity of lubricating can be automatically supplied.

Another object of the invention is to provide a bearing device for rotary machines, in which the surface of lubricating oil supplied can be maintained at a constant level.

Still another object of the invention is to provide a bearing device for rotary machines, in which a leakage of lubricating oil can be effectively prevented.

Still another object of the invention is to provide a bearing device for rotary machines, which can be used for a lengthy period of time without calling for a maintenance operation.

A further object of the invention is to provide a bearing device for rotary machines, which is adapted for supporting a rotary element rotating at a high speed under a large load while being properly lubricated with oil.

Other objects of the invention will become apparent from the following description on embodiments thereof with reference to the accompanying drawings.

According to the invention there is provided a bearing device which is so designed that a lubricating oil can be supplied at a proper viscosity and in a necessary minimum quantity to the portions where lubrication is most required, and comprises a roller or ball bearing supporting a rotary shaft, a bearing box supporting said roller or ball bearing and bearing covers closing both sides of said roller or ball bearing, and which is characterized in that pads impregnated with the lubricating oil are provided at positions facing the opposite side surfaces of the roller or ball bearing.

Namely, the portions of a roller or ball bearing which are desired to be lubricated is the portions where the rolling elements, such as rollers or balls, are in contact with the inner and outer rings of the bearing and, therefore, it is only necessary to supply a necessary minimum quantity of lubricating oil to said portions. To this end, according to the present invention pads impregnated with lubricating oil are arranged at positions facing the opposite side surfaces of the roller bearing, so that a very small quantity of lubricating oil oozing out from said pads may be supplied to the portions where said roller elements are in contact with the inner and outer rings of the bearing. The oozing of the lubricating oil from the pads results from temperature rise and spontaneous displacement of the oil during operation of the bearing. However, the quantity of the oozing oil is limited and the oil stops oozing after a certain quantity of oil has oozed out. Thus, it becomes necessary to replenish the oil to the pads from the outside so that a desired quantity of oil may constantly be supplied to the contacting surface of the inner and outer rings with the rolling elements.

Figure 1:
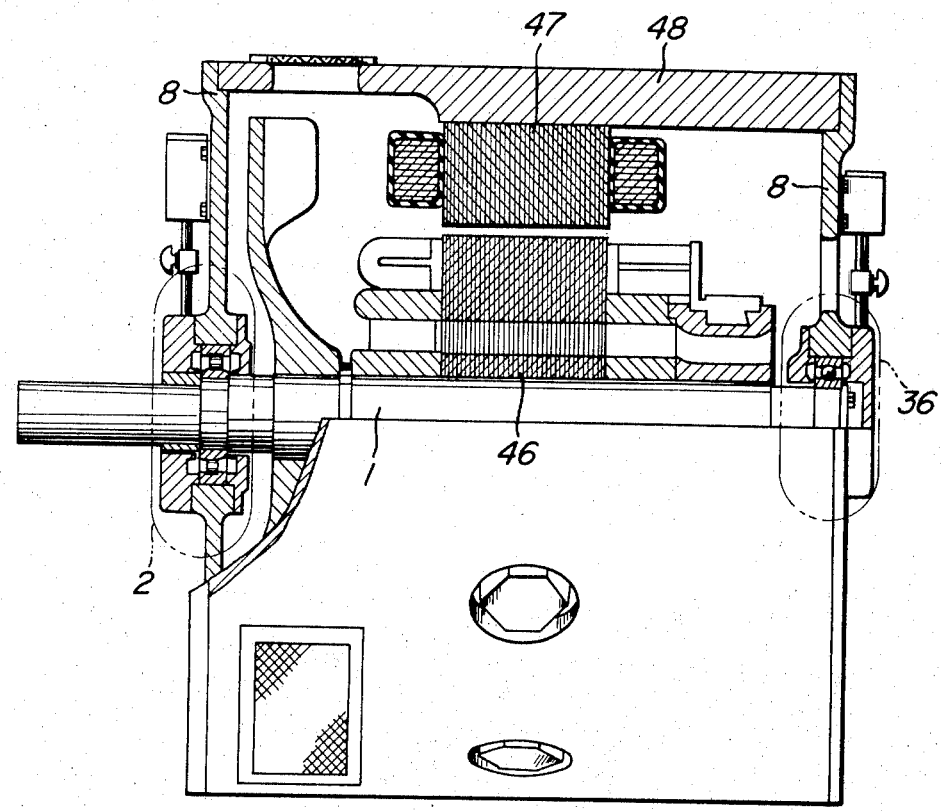
FIG. 1 is a front view, partially broken away, showing briefly the construction of an electric motor for vehicles.

The present invention will be described in detail with reference to the embodiments thereof shown in the drawings. Referring first to FIG. 1, there is shown an electric motor for vehicles. The electric motor shown comprises as its major components a stator 47, a rotor 46 arranged opposite to said stator 47, a rotary shaft 1 having said rotor 46 mounted thereon and bearing devices 2 and 36 rotatably supporting said rotary shaft 1. The stator 47 is composed of a stator core consisting of a laminate of thin steel plates, and a stator coil wound around said stator core. This stator 47 is fixed within a stator housing 48 by means of bolts or the like. The rotor 46 is also composed of a rotor core consisting of a laminate of thin steel plates, and a rotor coil wound around said rotor core, and is fixedly mounted on the rotary shaft 1 together with other rotor components such, for example, as a commutator or a ventilation fan. The rotary shaft 1 is arranged horizontally and rotatably supported by the bearing devices 2 and 36. The bearing devices 2 and 36 are fixedly mounted in end plates 8 closing the opposite ends of the stator housing 48. The electric motor for vehicles is essentially constructed as described above.

One end of the rotary shaft 1 is extended outwardly through one end plate 8 and a gear or coupling is mounted on the outwardly extending portion of the rotary shaft, so as to transmit the rotational force of the motor to an external machine therethrough. Therefore, the construction and type of the bearing device 2, provided in the end plate 8 to support the outwardly extending portion of the rotary shaft 1, are somewhat different from those of the other bearing device 36 which is provided in the other end plate 8 to support the other end of said rotary shaft not extending through said end plate 8.

First of all, the bearing device 2 provided in the end plate 8 to support the outwardly extending portion of the rotary shaft 1 will be described with reference to FIGS. 2 and 3. The horizontally extending rotary shaft 1 extends through a roller bearing 3 to be supported thereby. The roller bearing 3 is composed of an inner ring 4, an outer ring 5 and a plurality of rollers 6 retained between said inner ring 4 and outer ring 5 by retainers 7. The rotary shaft 1 extends through a bearing bore of the inner ring 4. The outer ring 5 is supported by a bearing box 9 which is fitted into a through-hole formed in the end plate 8 of the electric motor.

One side of the roller bearing 3 facing inside of the motor is closed by an inner bearing cover 10 which is attached to the bearing box 9 from the inside of the motor, and the other side of the roller bearing 3 is closed by an outer bearing cover 11 which is also attached to said bearing box 9 from the outside of the motor, so as to isolate the interior of the bearing from the inside and outside of the motor. The inner bearing cover 10 has a portion located adjacent the rotary shaft 1 and also has a lubricating oil retaining chamber 12 formed therein at a position facing the adjacent side surface of the roller bearing 3. The retainer chamber 12 has an annuler shape concentric with the rotary shaft 1 and is spaced by an inner peripheral wall 12' extending parallel to the rotary shaft 1 with a slight gap therebetween. Further, the inner bearing cover 10 is provided with an annular sealing groove 18 at a location axially adjacent the lubricating oil retaining chamber 12. In the lubricating oil retaining chamber 12 is disposed a pad 19 consisting, for example, of a felt or an oil-resisting fiber and being capable of retaining oil, and in the annular sealing groove 18 is disposed an oil seal 23 made from a felt. Inside the outer bearing cover 11 is provided a special ring 13 which is retained at a position facing the adjacent side surface of the roller bearing 3. This special ring 13 has an annular lubricating oil retaining chamber 14 at a position facing the adjacent side surface of the roller bearing 3 and also has an annular oil groove 15 formed in the outer peripheral wall thereof at a position axially adjacent said lubricating oil retaining chamber 14 and an annular sealing groove 16 formed in the inner peripheral wall theroef at a position radially opposite to said annular oil passage 15 and axially adjacent said chamber 14. One side wall of the lubricating oil retaining chamber 14 is extended axially inwardly parallel to and in slightly spaced relation with a ring member 21 as at 14', which ring member 21 is provided for securing the inner ring 4 of the roller bearing 3 in position. In the lubricating oil retaining chamber 14 is disposed an oil retaining pad 20 consisting, for example, of a felt or an oil-resisting fiber, and in the annular sealing groove 16 is disposed an oil seal 24 made from a felt. The annular oil groove 15 is open at the outer peripheral side but, in practice, forms a closed oil passage as its open side is closed by the outer bearing cover 11. This oil passage 15 is communicated at its top portion with a sealed oil tank 27 through an oil passage hole 25 extending in the outer bearing cover 11 and an oil conduit 17 communicating said oil passage hole 25 with said oil tank 27. The oil tank 27 is provided with a cover 28 which is removable for supplying lubricating oil into said tank and hermetrically sealed by a packing $P_1$. The oil conduit 17 is provided with valve means 26 at an intermediate portion thereof. Further, the oil passage 15 is communicated at its bottom portion with the lubricating oil retaining chamber 14 through an oil passage hole 29, so that the oil in the oil passage 15 may be supplied to the roller bearing 3. The height of the oil passage hole 29 defines the level L of the lubrication oil in which the roller bearing 3 is dipped. The lubricating oil retaining chambers 12 and 14 on both sides of the roller bearing 3 are communicated with each other by an oil passage 30 extending in the outer bearing cover 11, the bearing box 9 and the inner bearing cover 10. This oil passage 30 is formed below the oil level L. Further, the oil passage 30 is connected at one end of an oil drain passage 31, the other end of which is open to the outside of the motor and usually closed by a screw plug 31.

In order to prevent oil leakage, packings $P_2 - P_4$ are interposed at least between the inner and outer bearing covers 10, 11 and the bearing box 9 and between the outer bearing cover 11 and that side of the special ring 13 opposite to the bearing.

The bearing device constructed as described above operates in the following manner: As stated, the oil tank 27 is filled with the lubricating oil and hermetically closed by the cover 28. On the other hand, the valve means 27 provided in the oil conduit 17 is held open and hence the oil passage 15 is also filled with the lubricating oil. The lubricating oil is also present in the lubricating oil retaining chambers 12 and 14 up to the level L in conformance to the height of the oil passage hole 29. If the oil level L is too high, the lubricating oil will be intensely stirred by the rotating rollers 6 of the roller bearing 3 and the rotating retainers 7 retaining said rollers 6, possibly resulting in leakage of the lubricating oil outwardly of the bearing device. Conversely, if the oil level L is too low, only an insufficient quantity of lubricating oil will be supplied to the rollers 6 of the roller bearing 3 and the retainers 7, possibly resulting in burning of the contacting surfaces of the roller bearing 3 and the retainers 7 with the outer ring 5. Therefore, the height of the oil passage hole 29 is preferably selected such that the oil level L may be slightly higher than the level of contact between the outer ring 5 and the retainers 7 at the bottom portion of the roller bearing 3.

When the motor is operated under the condition described above, the roller bearing 3 and the retainers 7 are sufficiently lubricated with the lubricating oil picked up by the rollers 6 and retainers 7. The roller bearing 3 and retainers 7 are also lubricated with the lubricating oil which is impregnated in the pads 19 and 20 disposed in the lubricating oil retaining chambers 12 and 14, and oozing out from said pads during operation incident to temperature rise and spontaneous displacement thereof. It will be appreciated, therefore, that the pads 19 and 20 in this case play the role of soap component in the grease lubrication method. The pads 19 and 20 have an additional function of sucking the lubricating oil supplied through the oil passage 15 and the oil passage hole 29 and retain the same in a saturated state. The lubricating oil splashing during operation is absorbed by the pads 19 and 20, and returned to the oil reserved at the lower portions of said pads. Such recycle of the lubricating oil takes place quickly as the pads 19 and 20 are always impregnated with the lubricating oil in the saturated state. The pad 20 also serves the function of preventing an abrupt change in the rate of supply of the lubricating oil, relative to a fluctuation of the oil level L occurring incident to rotation of the roller bearing 3 and the function of filtering the lubricating oil to remove the foreign matters therefrom and supplying clean oil to the roller surfaces.

The leakage of oil from the bearing device during operation can be substantially completely prevented by the flow resistance to the lubricating oil, provided by the narrow gap between the walls 12', 14' of the lubricating oil retaining chambers 12, 14 and the rotary shaft 1 and ring member 21, and the viscosity of said lubricating oil. A further seepage of oil through said gap can be prevented by the oil seals 23, 24 provided at the outer end of said gap. During operation, the oil level L moves down due to consumption of oil, but in this case an air space is formed at the upper side of the oil passage hole 29 and air flows into the oil passage 15 through said air space. The air moves into the oil tank 27 and depresses the oil surface in said tank, so that the oil flows toward the roller bearing 3 from the hole 29 until the oil level L reaches the level flush with the height of said hole 29. Once the oil level has reached such level, the hole 29 is closed by the oil and air stops flowing into the passage 15. Therefore, the atmospheric pressure no longer acts in the oil tank 27 as said oil tank is hermetically sealed, and the lubricating oil stops flowing into the roller bearing from the oil passage 15.

When the lubricating oil at the lower portion of the roller bearing 3 has been contaminated and deteriorated after use for a lengthy period of time, the valve means 26 in the oil conduit 17 is first closed and then the plug 32 is removed to open the outer end of the oil drain passage 31 and to drain the deteriorated lubricating oil from the oil passage 30 to the outside of the bearing device through said oil drain passage. Drain of the deteriorated lubricating oil causes the oil level L to move downward so that the fresh lubricating oil present in the oil conduit 17 and the oil passage 25, 15 below said valve means flows into the lower portion of the roller bearing 3 and discharged to the outside through the oil passages 30, 31. Then the outer end of the oil drain passage 31 is closed with the plug 32 and the valve means 26 in the oil conduit 17 is opened, whereupon the lubricating oil in the oil tank 27 flows into the lower portion of the roller bearing 3 through the oil passages 25, 17 and the oil passage hole 29. Such downward flow of lubrication oil spontaneously stops when the oil surface reaches the level L flush with the heighest portion of the hole 29.

Where necessity arises to replenish the lubricating oil in the oil tank 27, this may be achieved simply by first closing the valve means 26 in the oil conduit 17 and then replenishing the lubricating oil upon removing the cover 28. After the lubricating oil has been replenished, the cover 28 is closed again to hermetically seal the oil tank 27 and the valve means 26 is opened. Instead of the valve means 26, a valve to control the flow of oil into the oil conduit 17 in association with the opening and closing operation of the cover 28 may be provided inside the oil tank 27, so that the supply of oil into the oil conduit 17 may be stopped when the cover 28 is opened but the oil may be freely flowable into said conduit 17 when said cover 28 is closed.

By limiting the quantity of oil supplied to the necessary minimum quantity and absorbing the oil splashing around the roller bearing 3, as described above, the prevention of oil leakage which has been considered almost impossible can be achieved very easily with a simple construction. In addition, the maintenance operation of the bearing device such as supply and discharge of oil, can be achieved simply by opening and closing the valve means 26 and cover 28, and screwing and removing the plug 32. Furthermore, the bearing device is operable for a lengthy period of time with the necessary minimum quantity of oil consumption. Therefore, the bearing device can be continuously used over an extended period, e.g., over its useful life, only with an intermittend supply of lubricating oil without necessitating disassembly of the device.

An electric motor for vehicles is exposed to dusts and rain water and, during operation, a negative pressure appears within the electric motor. Therefore, it is absolutely necessary to prevent the outside air from passing in the roller bearing 3. To this end, according to the invention an annular air chamber 34 is formed in the outer bearing cover 11 at a location adjacent the oil seal 24 and further an air bypass passage 35 is formed extending in the outer bearing cover 11, the bearing box 9 and the inner bearing cover 10, and communicating said air chamber 34 with the interior of the electric motor.

Since the air chamber 34 is provided between the rotating side and stationary side, it is preferable to form a crooked passage 33 between the outer bearing cover 11 and the ring member 21 so as to provide an increased flow resistance to the outside air. The outside air sucked into the bearing device under the influence of the negative pressure created within the electric motor is first admitted into the air chamber 34 via the crooked passage 33, sucked into the interior of the electric motor through the air bypass passage 35 without passing through the gap between the oil seal 24 and the ring member 21, as the flow resistance of said air bypass passage 35 is relatively greater than that of said gap, and discharged to the outside of the electric motor together with the motor cooling air being discharged. Although in the embodiment shown the air chamber 34 is formed only in the outer bearing cover 11, a similar air chamber may be formed in the inner bearing cover 10 at a location adjacent the oil seal 23.

Figure 4:
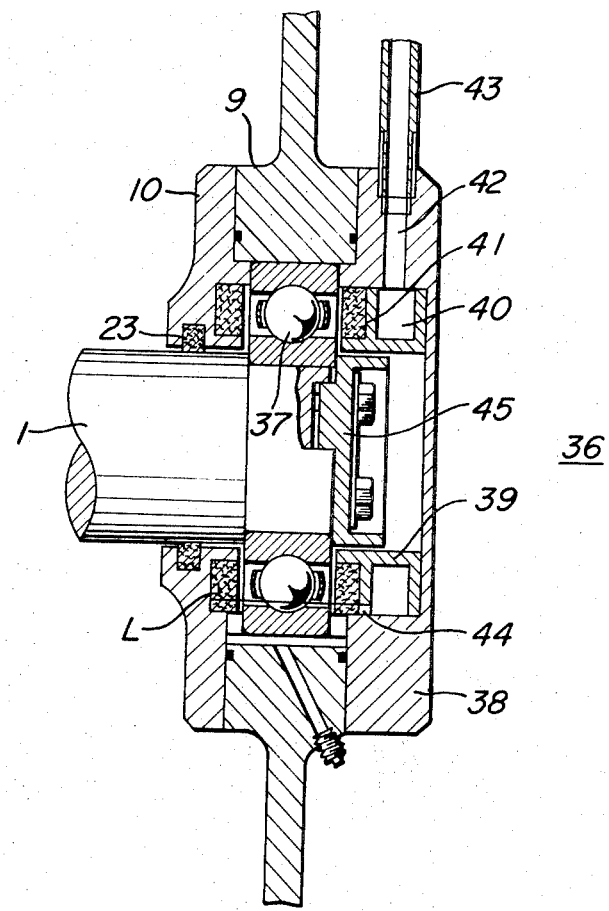
FIG. 4 is a vertical sectional view showing another embodiment of the bearing device for rotary machines, according to the invention.

Although the present invention has been described hereinbefore as applied to the roller bearing device mounted in the left hand end plate 8 of the electric motor, as viewed in FIG. 1, to support the outwardly extending portion of the rotary shaft, it should be understood that the invention is similarly applicable to a ball bearing device which is to be mounted in the other end plate 8 to support the other end portion of the rotary shaft 1 not extending through said end plate, as shown in FIG. 4. Namely, this bearing device comprises a ball bearing 37 to support the end extremity of the rotary shaft 1 and a bearing cap 45 secured to the end face of the rotary shaft 1 holding said ball bearing 37 in its position. The other construction, the bearing lubricating function and the lubricating oil feeding operation of this device are essentially the same as those of the preceding embodiment.

In case of this bearing device, since no load is connected to the end of the rotary shaft 1, an outer bearing cover 38 is fixed to a bearing box 9, covering the outer side surface of the ball bearing 37 and said end of the rotary shaft 1. Further, in this bearing device comprising the ball bearing 37, the interior of the device is completely isolated from the outside of the motor and hence there is no possibility of the outside air passing through the ball bearing 37 and there is no need of providing an air chamber in an inner bearing cover 10 and/or outer bearing cover 38. However, an air chamber may be provided in the inner bearing cover 10 at a location adjacent an oil seal 23 in the sense of preventing more completely the inward leakage of lubricating oil under the influence of negative pressure created within the motor.

The surface level L of lubricating oil in the ball bearing 37 is maintained preferably slightly above the bottom of the inner surface of the outer ring.

Figure 2:
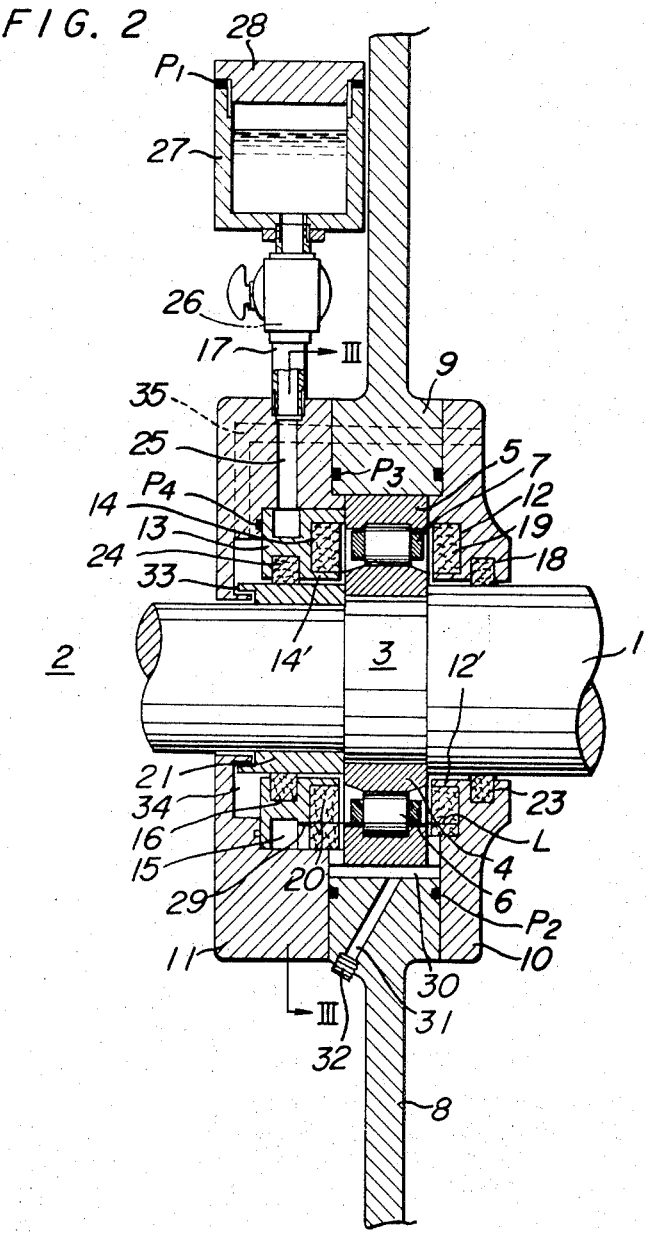
FIG. 2 is a vertical sectional view showing an embodiment of the bearing device for rotary machines, according to the present invention.
Figure 3:
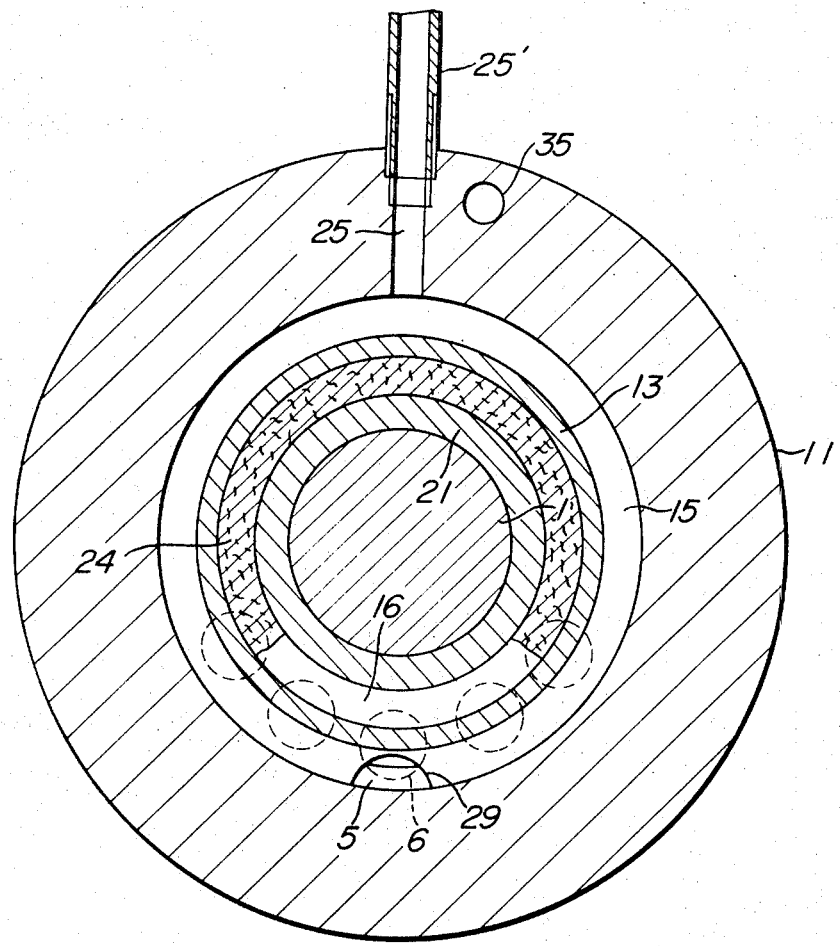
FIG. 3 is an enlarged sectional view taken along the line III — III of FIG. 2.

In the bearing device 36 comprising the ball bearing 37, a special ring 39 is somewhat different in shape from the special ring 13 in the roller bearing device shown in FIG. 2 as the end of the rotary shaft 1 is covered by the outer bearing cover 38 and hence an oil seal need not be provided inside said outer bearing cover 38.

Namely, the special ring 39 has formed therein an annular oil groove 40 and an annular lubricating oil retaining chamber 41 facine the adjacent side surface of the ball bearing 37, which are arranged side-by-side in the axial direction, and said oil groove 40 is communicated at the top portion with an oil passage 41 and an oil conduit 43, and at the bottom portion with said lubricating oil retaining chamber 41 through an oil passage hole 44 which defines the oil level L.

Although in either of the embodiments described herein the pads are provided on both sides of the roller bearing, it should be understood that only one of such pads may be provided on one side of the roller bearing. Further, although the bearing device of the invention has been described herein as applied to an electric motor, it will be obviously understood that the bearing device may be applied to all and any rotary machines utilizing a roller bearing.

According to the invention, as described herein, since the oil retainable pad is provided on one or each side of the roller bearing and the surface level of lubricating oil is controlled, it becomes possible to supply lubricating oil automatically and continuously at a proper viscosity and in a necessary minimum quantity to the portions where lubrication is most required. Therefore, the bearing device of the invention is sufficiently adapted for supporting a rotary element rotating at a high speed and with a large load.

In addition, the bearing device of the invention can be constructed in a smaller size and in a more compact from than the conventional oil-lubrication type bearing devices, and is free of oil leakage as a fluctuation of oil level can be prevented and recovery of splashing oil is possible owing to the provision of the oil retainable pad. Moreover, the supply and discharge of lubricating oil as well as the control of oil quantity can be achieved by a simple operation and, therefore, the labor required for maintenance of the bearing device can be drastically decreased.

Besides the merits described above, the bearing device of the invention is highly economical as it enables the lubricating purpose to be attained with only a small consumption of lubricating oil, and hence can be used for a lengthy period of time with only a simple oil supplying and discharging operation and without the necessity for disassembling the device. Thus, the present invention is of great practical advantage in rendering a bearing device free or substantially free of service over an extended period of use.

We claim:

1. A bearing device for rotary machines having a substantially horizontally extending rotary shaft, comprising a roller bearing for rotatably supporting the substantially horizontally extending rotary shaft, a bearing box supporting said roller bearing and bearing covers covering the axially opposite side surfaces of said roller bearing, characterized in that an oil retainable pad is provided at a fixed position facing one side surface of said roller bearing, means is provided for automatically supplying a lubricating oil to said pad, a lubricating oil retaining chamber is formed in the bearing covers, said oil retainable pad being disposed in said oil retaining chamber and being provided with a cylindrical wall means for holding said oil retainable pad out of contact with the rotary shaft.

2. A bearing device for rotary machines, having a substantially horizontally extending rotary shaft comprising a roller bearing for rotatably supporting the substantially horizontally extending rotary shaft, a bearing box supporting said roller bearing and bearing covers covering the axially opposite side surfaces of said roller bearing, characterized in that an oil retainable pad is provided at a fixed position facing one side surface of said roller bearing, means is provided for automatically supplying a lubricating oil to said pad, and a lubricating oil retaining chamber for holding the oil retainable pad therein is formed in the bearing cover and an oil passage communicating with means for automatically supplying the lubricating oil is provided in substantially axially adjacent relation to said lubricating oil retaining chamber, said lubricating oil retaining chamber and oil passage communicating with each other by an oil passage hole at the bottom of said lubricating oil retaining chamber, whereby the surface level of oil in said lubricating oil retaining chamber and at the bottom of said roller bearing is defined by the top level of said hole.

3. A bearing device for rotary machine, according to claim 2, wherein said lubricating oil retaining chamber has a cylindrical wall by which the oil retainable pad is held out of contact with the rotary shaft.

4. A bearing device for rotary machines having a substantially horizontally extending rotary shaft comprising a roller bearing for rotatably supporting the substantially horizontally extending rotary shaft, a bearing box supporting said roller bearing and bearing covers the axially opposite side surfaces of said roller bearing, characterized in that an oil retainable pad is provided at a fixed position facing one side surface of said roller bearing; a hermetically sealed oil tank is provided at a level at least higher than the bottom of the inner surface of the outer ring of said roller bearing; a lubricating oil supply opening communicating with said oil tank is located at a position facing said oil retainable pad and the surface level of oil at the lower portion of the roller bearing is defined by the top level of said lubricating oil supply opening.

5. A bearing device for rotary machines, according to claim 4, wherein said oil retainable pad is disposed in a lubricating oil retaining chamber formed in the bearing cover.

6. A bearing device for rotary machines, according to claim 5, wherein said lubricating oil retaining chamber has a cylindrical wall by which the oil retainable pad is held out of contact with the rotary shaft.

7. A bearing device for rotary machines, according to claim 4, wherein a lubricating oil retaining chamber for holding the oil retainable pad therein is formed in the bearing cover and an oil passage communicating with said hermetically sealed oil tank is provided in substantially axially adjacent relation to said lubricating oil retaining chamber, said lubricating oil retaining chamber and oil passage communicating with each other by an oil passage hole at the bottom of said lubricating oil retaining chamber, whereby the surface level of oil in said lubricating oil retaining chamber and at the bottom of the roller bearing is defined by the top level of said hole.

8. A bearing device for rotary machines, according to claim 7, wherein said lubricating oil retaining chamber has a cylindrical wall by which the oil retainable pad is held out of contact with the rotary shaft.

9. A bearing device for rotary machines, according to claim 7, wherein said hermetically sealed oil tank is provided with a cover and valve means is provided intermediary of said oil tank and said oil passage.

10. A bearing device rotary machines having a substantially horizontally extending rotary shaft, comprising a roller bearing for rotatably supporting the substantially horizontally extending rotary shaft, a bearing box supporting said roller bearing and bearing covers covering the axially opposite side surfaces of said roller bearing, characterized in that an annular lubricating oil retaining chamber for holding therein an oil retainable pad facing the adjacent side surface of the roller bearing is formed in the inside surface of one of said bearing covers, while a special ring is mounted in the inside of the other bearing cover, said special ring having formed therein an annular lubricating oil retaining chamber for therein an oil retainable pad facing the adjacent side surface of said roller bearing and an oil passage adjacent said second-mentioned lubricating oil retaining chamber, and said oil passage communicating at its top end with a hermetically sealed oil tank and communicating at its bottom end with said second-mentioned lubricating oil retaining chamber by an oil passage hole, whereby the surface level of oil in said respective lubricating oil retaining chambers and at the bottom of said roller bearing is defined by the top level of said hole.

11. A bearing device for rotary machines, according to claim 10, wherein said hermetically sealed oil tank is provided with a cover and valve means is provided intermediary of said oil tank and said oil passage.

12. A bearing device for rotary machines, according to claim 10, wherein an oil passage is provided communicating said lubricating oil retaining chamber with each other at a level below said surface level of oil.

13. A bearing device for rotary machines, according to claim 12, wherein an oil drain passage os provided communicating said oil passage with the exterior of the machine and a plug is removably fitted into the outer end of said oil drain passage.

14. A bearing device for rotary machines, according to claim 10, wherein each of said lubricating oil retaining chambers has a cylindrical wall by which the oil retainable pad is held out of contact with the rotary shaft.

15. A bearing device for rotary machines, according to claim 10, wherein an air bypass passage is provided adjacent the roller bearing, communicating the outside and inside of the machine with each other.

16. A bearing device for rotary machines, according to claim 11, wherein there are provided an oil passage communicating said lubricating oil retaining chambers with each other at a level below said surface level of oil and an oil drain passage communicating said oil passage to the outside of the machine, and a plug is removable fitted into the outer end of said oil drain passage, and further each of said lubricating oil retaining chambers has a cylindrical wall by which said oil retaining pad is held out of contact with the rotary shaft.

* * * * *